Patented July 2, 1940

2,206,562

UNITED STATES PATENT OFFICE 2,206,562

PROCESS FOR THE MANUFACTURE OF ALUMINUM

Henri Louis Gentil, Paris, France, assignor to Société d'Electrochimie, d'Electrometallurgie et des Acieries Electriques d'Ugine, Paris, France, a corporation of France No Drawing. Application January 3, 1939, Serial No. 249,150. In France January 11, 1938

8 Claims. (Cl. 75—68)

The well known process of manufacturing aluminum by electrolytically treating bauxite, shows several disadvantages:

(a) The bauxite must undergo a preliminary transformation;

(b) The process is a costly one because it necessitates a pure alumina to be first prepared;

(c) The metal obtained contains no more than 99.5% of pure aluminum.

By the present invention which discards all these disadvantages, a metal containing up to 99.95% of pure aluminum is obtained with a low cost and a high yield.

This invention principally consists in directly treating, at a temperature above the volatilising temperature of the aluminum and under a high vacuum, i. e. an ore containing an oxydised compound of aluminum, an aluminous ore. such e. g. as bauxite, volcanic cinders, clay, even when poor in aluminum, by a reducing agent capable of reducing at the high temperature, of the process. the said aluminous oxygenated compounds of the ore.

A suitable temperature for the operation is 1800° C. although already good results may be obtained at a temperature of about 1200° C. Nevertheless the temperature should not be so high that owing to the value of the vacuum which has been chosen other metals are liberated by a reduction reaction and are volatilized which are condensible at the condensing temperature of aluminum and are soluble in aluminum or are miscible therewith. The higher the vacuum the lower is the temperature at which the process can be performed, and vice versa.

On the other hand a vacuum of 2–10 mm. of mercury gives especially advantageous results at the temperatures above referred to. Thus a temperature of 1200° C. is convenient for the process when the vacuum reaches 2 mm. of mercury.

All the reducing agents capable of reducing the aluminous compounds under the conditions quoted above may be used for carrying out the invention, provided they are cheap. Metallic sulphides are particularly advantageous and especially half-raw sulfides as obtained by separating from natural metallic sulfides the gangue and the exterior impurities, i. e. the earthy or organic parts which may be adhering to the ore. Iron sulfide is especially suitable because of its strong reducing power, its low cost, the shape under which it is sold, the easiness of eventually drying it and splitting it in pieces and grinding it and finally because when being itself oxydised at the expense of the oxydised compounds of the aluminum contained in the ore it forms sulphurous anhydride ($SO_2$) which can be collected and which is a valuable product. Calcium sulfide is also a good reducer to be used in the process but it is more expensive than iron-sulfide.

Under the action of the high heat and of the far reaching vacuum the reducing agent reduces the oxygenated aluminum compounds of the ore to which the reducing agent has been mixed, by liberating aluminum which is volatilised and later on condensed.

It is preferable to finely grind the ore and the reducing agent, to thoroughly intermix them and finally to mould the mixture into briquettes according to a process well known in the art and to submit these briquettes under vacuo to the action of a high heat.

When e. g. operating by treating at 1600° C. under a vacuum of 2–3 mm. of mercury, by means of iron-sulphide obtained for instance from iron-pyrites, a low grade bauxite containing:

| | Percent by weight |
|---|---|
| $Al_2O_3 \cdot H_2O$ | 42 |
| $SiO_2$ | |
| $Fe_2O_3$ | |
| $TiO_2$ | 58 |
| Impurities | | the iron sulphide directly reduces the alumina contained in the bauxite; the iron and the sulphur respectively combine with the oxygen of the alumina by forming iron oxyde ($Fe_2O_2$) and sulphurous anhydride ($SO_2$) and aluminum is liberated. Complex sulfides are simultaneously formed. The aluminum is volatilised and is collected by a condensation process. The sulphurous anhydride is simultaneously separated and collected by any known means. The aluminum obtained contains 99 .95% of pure aluminum and the yield is 90% of the aluminum contained in the ore. An excess of reducing agent relatively to the aluminum contained in the ore should of course be used because some of the reducing agent is consumed for performing by-reactions notably for the formation of the complex sulfides above referred to. Generally the said excess is of about 10% of the weight of the theoretical quantity.

Thus it appears that, without any preliminary transformation of the bauxite and without the preparation of a very pure alumina, a highly pure aluminum is obtained by one operation only (concomitant reduction, volatilisation and condensation) with a high yield and at a low cost for the raw materials and the workmanship.

The process may be carried out in any furnace capable of being heated at the required temperature, of resisting to a far reaching vacuum and of not being too rapidly destroyed by the reacting materials or the products obtained. Known electrically heated furnaces having an aluminous lining (e. g. silimanite or corundum) may be used for the purpose. Any other equivalent heating means other than electricity could also be used.

I claim:

1. A process for the manufacture of very pure aluminum consisting of directly treating an aluminum ore containing an oxygenated aluminum compound, under a far reaching vacuum and at a high temperature, by a metallic sulphide capable of reducing the said oxygenated aluminum compound at a temperature above the temperature of volatilization of aluminum and condensing the aluminum vapours evolved.

2. A process for the manufacture of very pure aluminum, consisting of directly treating an aluminum ore containing an oxygenated aluminum compound, under a far reaching vacuum and at a high temperature, by a metallic sulfide capable of reducing the said oxygenated aluminum compound at a temperature above the temperature of volatilization of aluminum and condensing the aluminum vapours evolved.

3. A process for the manufacture of very pure aluminum, consisting of directly treating by iron sulfide an aluminum ore containing an oxygenated aluminum compound under a far reaching vacuum and at a high temperature and condensing the aluminum vapours evolved.

4. A process for the manufacture of very pure aluminum, consisting of directly treating by calcium sulfide an aluminum ore containing an oxygenated aluminum compound under a far reaching vacuum and at a high temperature and condensing the aluminum vapours evolved.

5. A process for the manufacture of very pure aluminum consisting of directly treating an aluminum ore containing an oxygenated aluminum compound under a far reaching vacuum and at a temperature of about 1200–1800° C., by a metallic sulphide capable of reducing the said oxygenated aluminum compound at the said temperature and condensing the aluminum vapours evolved.

6. A process for the manufacture of very pure aluminum, consisting of directly treating an aluminum ore containing an oxygenated aluminum compound under a vacuum of about 2–10 mm. of mercury and at high temperature by a metallic sulphide at a temperature above the temperature of volatilization of aluminum and condensing the aluminum vapours evolved.

7. A process for the manufacture of very pure aluminum consisting of directly treating by a metallic sulfide an aluminum ore containing alumina, under a far reaching vacuum and at a high temperature above the volatilization temperature of aluminum and condensing the aluminum vapours evolved.

8. A process for the manufacture of a very pure aluminum, consisting of directly treating by a metallic sulfide an aluminum ore containing alumina, under a far reaching vacuum and at a high temperature above the volatilization temperature of aluminum and condensing the aluminum vapours evolved and separating the sulfurous anhydride produced.

HENRY LOUIS GENTIL.